(12) United States Patent
Skliar et al.

(10) Patent No.: US 8,970,936 B2
(45) Date of Patent: Mar. 3, 2015

(54) METHOD AND SYSTEM FOR FINE ADJUSTMENT OF OPTICAL ELEMENTS POSITION

(75) Inventors: Alexander Skliar, Barkan (IL); David Gonen, Elkana (IL); Vladimir Wainstein, Rishon le Zion (IL)

(73) Assignee: Raicol Crystals Ltd., Yehud (IL)

( * ) Notice: Subject to any disclaimer, the term of this patent is extended or adjusted under 35 U.S.C. 154(b) by 1116 days.

(21) Appl. No.: 12/911,134

(22) Filed: Oct. 25, 2010

(65) Prior Publication Data

US 2011/0038026 A1 Feb. 17, 2011

Related U.S. Application Data

(63) Continuation of application No. PCT/IL2009/000368, filed on Apr. 5, 2009.

(60) Provisional application No. 61/048,612, filed on Apr. 29, 2008.

(51) Int. Cl.
| | | |
|---|---|---|
| *G02F 1/03* | (2006.01) | |
| *H01S 3/127* | (2006.01) | |
| *G02B 7/00* | (2006.01) | |
| *H01S 3/107* | (2006.01) | |

(52) U.S. Cl.
CPC ............. *H01S 3/127* (2013.01); *G02B 7/005* (2013.01); *G02F 1/0322* (2013.01); *H01S 3/107* (2013.01)
USPC .......................................... 359/257

(58) Field of Classification Search
CPC ..... G02F 1/0322; G02F 1/055; G02F 1/0551; G02B 27/00
USPC .......... 359/245, 246, 257, 320; 372/9, 10, 12, 372/20
See application file for complete search history.

(56) References Cited

U.S. PATENT DOCUMENTS

| | | | |
|---|---|---|---|
| 2007/0236771 | A1 | 10/2007 | Zadoyan et al. |
| 2009/0237768 | A1* | 9/2009 | Zadoyan et al. ............. 359/257 |

OTHER PUBLICATIONS

"Catalog" 2003, Linos Photonics, Goettingen, p. 16, p. 18.
International Search Report from PCT/IL2009/000368 mailed Jul. 22, 2009.

* cited by examiner

*Primary Examiner* — Tuyen Tra
(74) *Attorney, Agent, or Firm* — Browdy and Neimark, PLLC

(57) ABSTRACT

An optical device is presented comprising: a cavity defining a cavity axis of light propagation; at least two optical elements having their optical axes, respectively, and being aligned along said cavity axis such that the optical axes of the optical elements coincide with said cavity axis; and a positioning unit associated with at least one of said at least two optical elements. The positioning unit is configured and operable for providing controllable axial rotation of said at least one optical element about the cavity axis, thereby enabling controllable fine adjustment of orientation of said at least one optical element relative to the at least one other optical element, while keeping the aligned positions of the optical elements with respect to said cavity axis.

23 Claims, 4 Drawing Sheets

FIG. 1A (GENERAL ART)

METHOD AND SYSTEM FOR FINE ADJUSTMENT OF OPTICAL ELEMENTS POSITION

CROSS-REFERENCE TO RELATED APPLICATIONS

This Application is a Continuation application of International Application PCT/IL2009/000368 filed on Apr. 5, 2009, which in turn claims priority to U.S. Provisional application 61/048,612 filed on Apr. 29, 2008, both of which are incorporated herein by reference in their entirety.

FIELD OF THE INVENTION

The present invention relates to positioning mechanism for controllably adjusting position of an optical element. The invention is particularly useful for adjusting the position of a crystal in dual-crystal Pockels cell.

BACKGROUND OF THE INVENTION

Optical systems designed for switching, modulating and amplifying laser light beams often make use of electro-optical materials. In lasers or other optical systems, electro-optical materials are often configured as Pockels cells based on Pockels electro-optic effect where the indices of refraction both of ordinary and extraordinary rays are changed under the applied electrical field. The Pockels effect could occur in materials without the center of symmetry like Rubidium Titanyl Phosphate (RTP), Rubidium Titanyl Arsenate (RTA), Potassium Titanyl Phosphate (KTP), Lithium Niobate (LN), Lithium Tantalate (LT) and other materials.

Pockels cells are implemented in many scientific and technical applications. Pockels cell combined with polarizers are used in many applications and are particularly used to control light switching and/or light modulation. In such applications, the polarization orientation of electro-optical crystal is varied according to a variation of an electric field applied to the Pockels cells, consequently varying the amount of light that passes through the polarizer and creating a shutter/modulator. By either applying or turning off the external electrical field to electro-optic material could switch between 0° optical rotation and 90° optical rotation this shutter is able "to open" and "to close" the light very fast with the rate of a few nanoseconds. The same method is used for beam modulation by the polarization rotation between 0° and 90°, in this case the beam as viewed through the polarizer shows an amplitude-modulated signal.

In other applications Pockels cells are used for laser amplification, a laser medium in a regenerative amplifier cavity is pumped to generate an excess of excited atoms in the medium. Pockels cells are then used for amplification of gain medium by preventing the oscillating light coming out of the cavity. When the Pockels cell is switched the intra-cavity light is able to emit out of the cavity and by such a way creating a fast high energy pulse. This setup could be used for many applications like Q-switching, chirped pulse amplification and cavity dumping. In addition, Pockels cells could be used for quantum key distribution and in electro-optic probes.

The thermo compensated Pockels cell without any additional thermo stabilizing device is based on using two identical crystals. It is known that electro-optical properties of the non linear optical materials are temperature dependent and in order to achieve a stable and reliable operation of the Pockels cell the temperature of the used nonlinear material must be stabilized. Using two crystals allows the stable performance of the Pockels cell without any thermo stabilizing unit. The light propagates is either along the X or Y axes (depending on the crystal cut plane), both of which exhibit birefringence. The two crystals are located in series by such a way that the second (or the first) is oriented at 90° regarding the first (or the second) crystal. In this arrangement any change in the birefringence of the first crystal caused by the temperature is cancelled or compensated by the other crystal keeping the whole Pockels cells without the temperature influence. In order to achieve the perfect matching both crystals should have the same dimensions. In addition, material properties should be similar for both crystals in order to obtain a high contrast ratio of Pockels cell. Moreover, the matching between crystal properties and the mechanical mount are required in order to provide a stable reliable operation of the Pockels cell over the wide temperature range from −60° C. till +120 ° C. The two crystals are mounted on the same electrically conducting base and the upper electrodes are wired together as well so both crystals have the same voltage all the time. Generally, both crystals are glued to the holder by such a way to get the best matching between them and achieve the highest contrast ratio. Once the crystals mounted, there is not any possibility for further optimization that might be required during the operation in the customer end system.

The Pockels cells based on thermo-compensated design are used in many applications where pulses are varied from picoseconds to milliseconds range. It was observed that during operation of Pockels cells with femtosecond range pulses the sideband pulses of the same femtosecond range duration near the main pulse were observed. Generally, for longer pulse these femtosecond sideband pulses might not be observable and thus it has a negligible influence on the main pulse while for femtosecond main pulse the sideband pulses reduce the main pulse intensity. It was observed that slight variations in the offset angle between the two crystals (i.e. slightly above or below 90°) may reduce or even eliminate the sideband pulses. The regular common technique of the two crystals mounting by gluing does not provide the needed optimization for femtosecond range pulses and more precise adjustment is required.

US Patent Publication No. 2007/0236771 discloses a method and system for laser amplification using a dual-crystal Pockels cell. In this system, the Pockels cell is constructed to enable adjustment of the rotational orientation of one crystal relative to the other crystal. The rotational orientation of one or both crystals in the Pockels cell is adjusted to control sidebands in the laser pulse.

GENERAL DESCRIPTION

There is a need in the art to facilitate orientation of an optical element with respect to an optical axis of light propagation through an optical system, particularly but not limited to adjustment of the orientation of crystal elements within a common cavity.

The present invention provides a novel method and system for fine adjustments of the rotational orientation of the optical elements in the system. This technique can be used for fine adjusting the orientation of one crystal with respect to the other and with respect to the light propagation axis in a Pockels cell.

According to one broad aspect of the invention, there is provided an optical device comprising: a cavity defining a cavity axis of light propagation; at least two optical elements having their optical axes, respectively, and being aligned along said cavity axis such that the optical axes of the optical elements coincide with said cavity axis; and a positioning unit associated with at least one of said optical elements and configured and operable for providing controllable axial rotation of said at least one optical element about the cavity axis, thereby enabling controllable adjustment of a position of said at least one optical element relative to a position of the at least one other optical element, while keeping the aligned positions of the optical elements with respect to said cavity axis.

The optical elements may be crystals. The device may be configured and operable as a Pockels cell.

In some embodiments of the invention, the position of the at least one other optical element may be fixed within the cavity.

Preferably, the at least one rotatable optical element is prevented from any movement along or across the cavity axis, as well as from being tilted with respect to said cavity axis.

In some embodiments of the invention, the rotatable optical element is fixed on a rotatable support. Generally, each of the optical elements may be mounted on its own support at a fixed position with respect to the support, and the support of the at least one optical element is mounted for axial rotation about the cavity axis.

In some embodiments of the invention, the positioning unit comprises an elongated element which is mounted for reciprocating movement from its retracted inoperative position in which its distal end is spaced from said rotatable support to its extracted position in which the distal end is brought into contact with said rotatable support pushing it for rotation.

According to another broad aspect of the invention, there is provided a system comprising the above-described optical device, and comprising a light detection unit. The latter receives light output from the optical device and generates data indicative thereof (e.g. a time profile of the output light). The output light is controlled during the manipulation of the angular position of the rotatable optical element, and the optimal position of said element is then fixed in accordance with the desired light output to be obtained.

In an example of the current invention applied for a dual crystal Pockels cell, the two crystals are mounted on separate holders (supports) that are incorporated into the one fixture (housing) while the one holder with the crystal is attached with the fixture without any possibility of adjustment and the other holder with a crystal is mounted for rotation about the light propagation axis that is also the crystal axis. In turn, the fixture is introduced into the optical device (frame) that is mounted into the end user system for the final rotational adjustment (e.g. in order to decrease or cancel completely the sideband pulses). To make said rotational adjustment the system has a positioning unit with a special rotational mechanism that allows a rotation of one support with the crystal in regards to the other one for very small rotation angle while the both main and sideband pulses are observed by a scope. The adjustable support with the one crystal is stabilized at the position where the sideband pulses reduced to the minimum or canceled and the position is "stored" for further operation.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 1A shows schematically the principles underlying the relative orientation of the crystals in a Pockels cell;

DETAILED DESCRIPTION OF EMBODIMENTS

The present invention provides a novel method and apparatus for a precise adjustment of the position of optical elements in an optical system. Said adjustment includes fine axial rotational adjustment of at least one of said optical elements about the optical axis of light propagation through the system. The invention is particularly useful for dual crystal Pockels cells used for switching of ultra-fast laser pulses. In these cases such adjustment may or eliminate or at least significantly reduce sideband pulses in a laser pulse system.

FIG. 1A shows an optical cavity 20 having an optical axis CA of light propagation through the cavity, and including two optical elements 10 and 10'. The optical elements are arranged in a spaced-apart relationship along said optical axis CA such that said optical axis passes through each of the optical elements. Various applications require precise alignment (arrangement) of the optical elements with respect to one another and/or with respect to the light propagation axis. For example, considering a dual crystal, thermo compensated Pockels cell, it is formed by two identical electro-optical crystals 10 and 10' which are aligned along the optical axis CA passing through each of the crystals. The crystals are oriented within the cavity such that the crystal axis substantially coincides with the optical axis CA. Thermo compensation, based on the transverse effect known in the art, is achieved by an arrangement of the two crystals with an angular displacement W (usually about 90°) of one crystal relative to the other crystal about the optical axis CA of light propagation through both. Such angular displacement is illustrated in FIG. 1A showing the X' and Z' axes of the second crystal 10' angularly displaced relative to the X and Z axes of the first crystal 10 by a displacement angle W about the optical axis CA. An effect of thermal dependant birefringence of the first crystal 10 is compensated by the similar thermal effect occurring at the second crystal 10' rotated with angle W about the optical axis CA with respect to the first. Thus, in cases where a Pockels cell (like the one illustrated in FIG. 1A) is operated with a pulse laser, sideband pulses accompanying the main pulse are usually observed. A reduction or elimination of these sideband pulses may be accomplished by a minute changes in the rotation angle W.

Figure 1B:
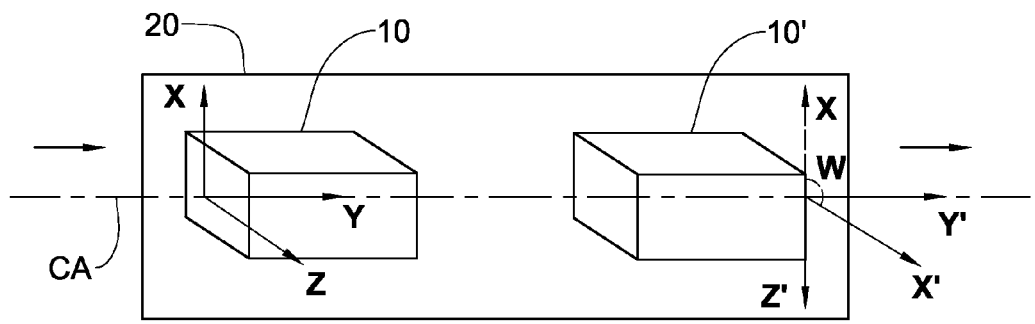
FIG. 1B is a block diagram of an optical system of the present invention, suitable to be used in a Pockels cell.
Figure 1B:
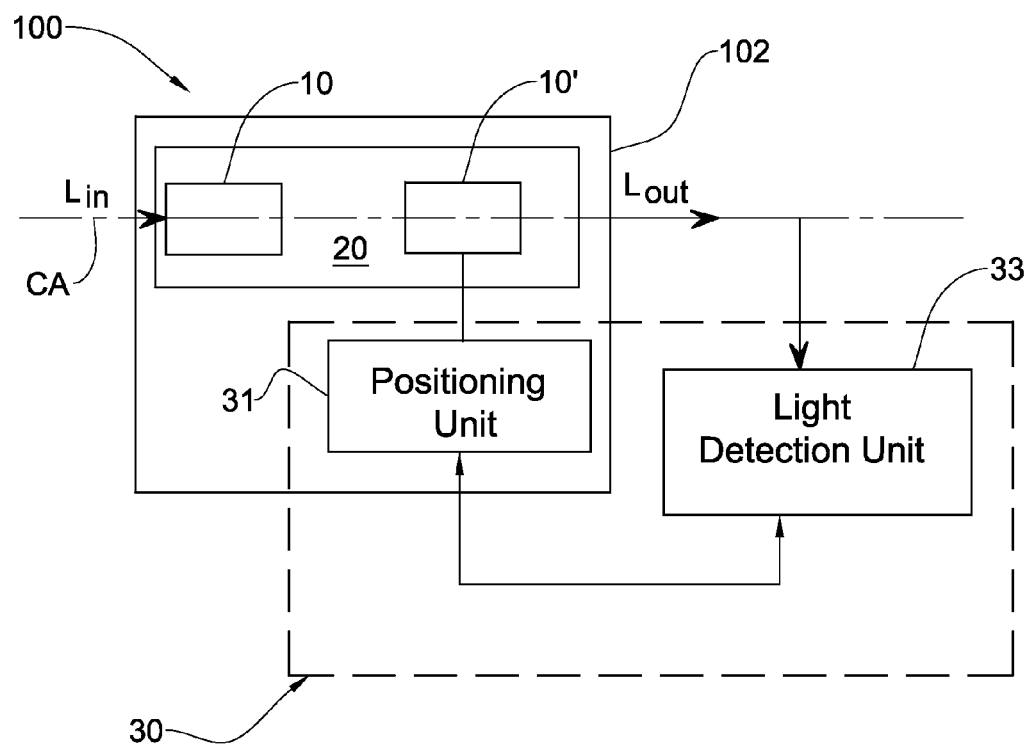

Reference is made to FIG. 1B illustrating a block diagram of an optical system, generally designated 100, configured and operable according to the invention. To facilitate understanding the same reference numbers are used to identify components that are common in all the figures referred to herein. System 100 includes an optical device 102 having a cavity 20 defining a light propagation axis CA, and two optical elements 10 and 10' (e.g. electro-optical crystals) having their optical axis Y and Y'.

Also provided in the system 100 is a control unit 30, which includes a positioning unit 31 incorporated in the optical device 102 and being associated with one of the optical elements, element 10' in the present example, and a light detection unit 33 which may or may not be a part of the optical device 102.

It should be noted that the system may include more than two optical elements, where a position of at least one of them with respect to at least one other can be adjusted.

The arrangement of the optical elements 10 and 10' is such that the optical axes Y and Y' of the optical elements coincide with the cavity axis CA. It should be understood that when speaking about a crystal, axis Y (or Y') constitutes the crystal axis. The system of the present invention allows for re-adjustment of the position of at least one optical element with respect to the other and/or with respect to the cavity axis, while keeping the required alignment (coincidence) between the elements' optical axes and the cavity axis. To this end, the positioning unit 31 is configured and operable to enable rotation of the optical element 10' about the cavity axis CA at a certain angle. It should be understood, although not specifically shown, that the configuration may be such that the other optical element 10 may also be mounted for controllable adjustment of its orientation. The positioning unit 31 comprises an appropriate mechanical assembly (not shown here) which is directly connectable to the respective optical element or via the optical element support, to perform the rotational adjustment of said optical element to provide a desired orientation thereof. The mechanical assembly is preferably configured to prevent any other movement of said optical element. Also, the mechanical assembly preferably restricts the rotational movement of element 10'.

The following is an example of the implementation of the optical device 102 showing more specifically the positioning unit 31.

Figure 2A:
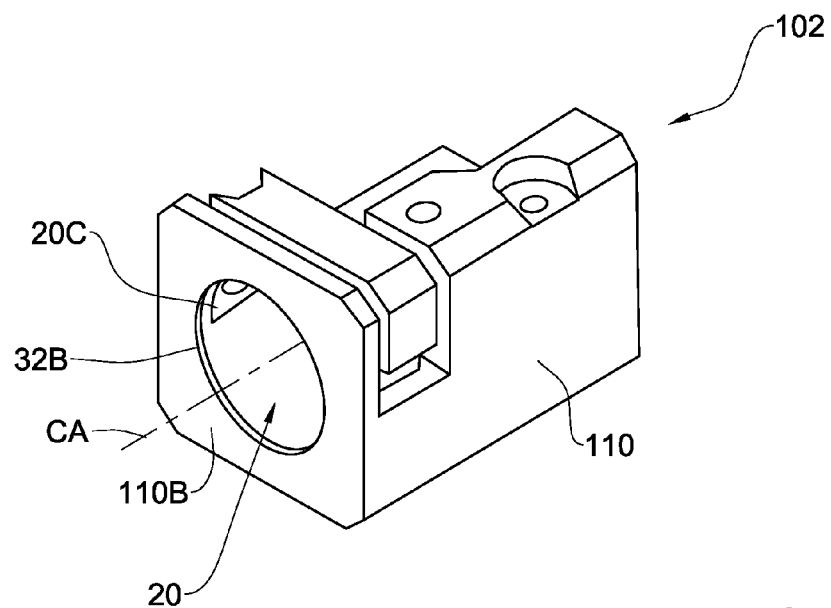
FIGS. 2A and 2B are opposite perspective views of an example of an optical device suitable to be used in the system of FIG. 1B.
Figure 2B:
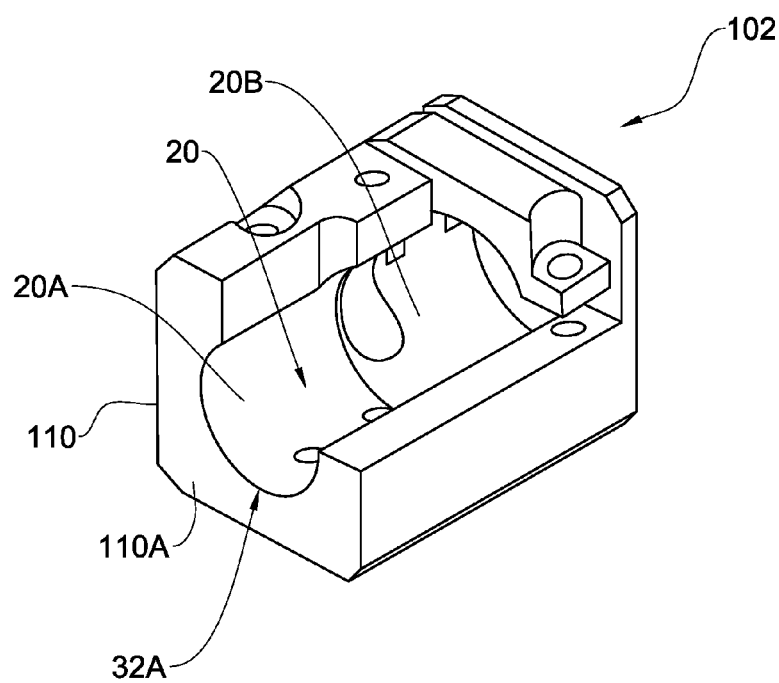

FIGS. 2A and 2B show two opposite perspective views of an optical device 102. The device has a hollow housing 110 having front and rear facets 110A and 110B formed with light input/output openings 32A and 32B. Such housing thus defines a cavity 20 for light propagation. The cavity 20 has two substantially cylindrical cavity portions 20A and 20B arranged along a common symmetry axis CA and defining two sites, respectively, for accommodation of the two optical elements with their respective supports. The cavity portion 20A is intended for accommodation of the optical element which needs not be rotated/moved during the system operation, while the cavity portion 20B is configured for accommodation therein the controllably rotatable optical element. Also, the cavity 20 is configured to prevent any movement of the rotatable optical element other than rotation about the axis CA. In the present example, this purpose is achieved by providing a radius of the second cavity portion 20B somewhat greater than the radius of the first cavity portion portions 20A, and providing another barrier 20C at the other side of the cavity portion 20B. This bather 20C is in the form of a ring-like projection from the inner surface of the facet 110B around at least a part of the opening 32B. By this, a support element when placed within and confined by the cavity portion 20B is prevented from a longitudinal movement along the cavity axis.

Figure 3A:
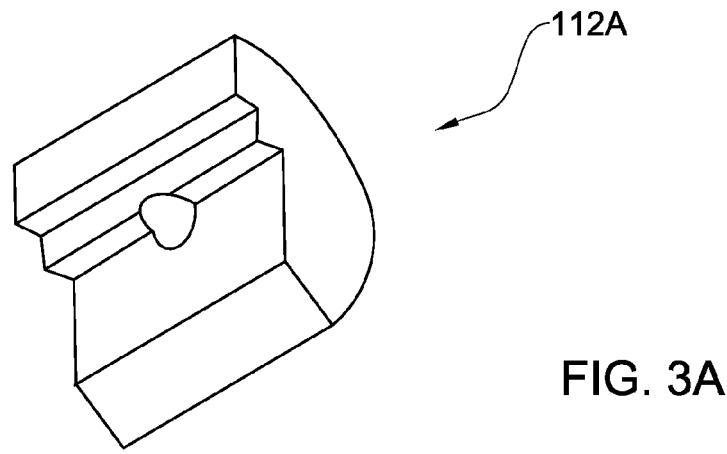
FIGS. 3A and 3B show more specifically two supports for two optical elements respectively used in the device of FIGS. 2A-2B.
Figure 3B:
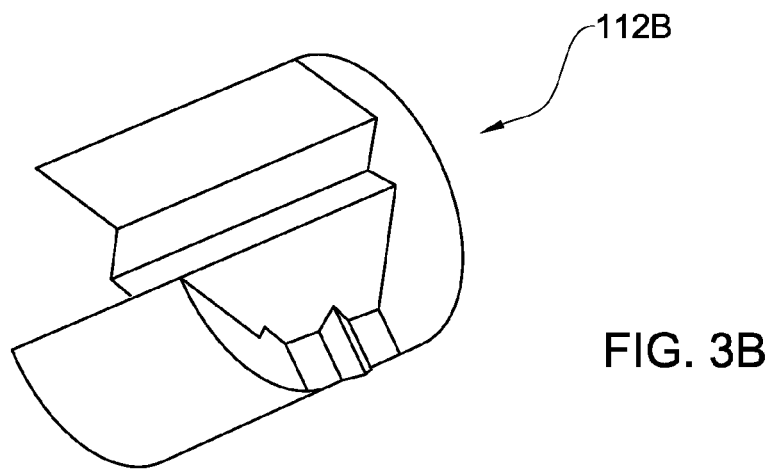

Thus, the first cavity portion 20A is configured to carry the static (not rotatable) support (shown as 112A in FIG. 3A) which is appropriately fixed within said cavity portion. The second cavity portion 20B is configured to carry the rotatable (cylindrical) support (shown as 112B in FIG. 3B). The support 112B has a semi cylindrical shape and dimensions similar to those of the cavity portion 20B to be thereby adapted to fit precisely within said cavity portion.

The positioning unit 31 has an angular adjustment mechanism configured to push the support element 112B to rotate around its axis of symmetry (constituting the optical axis of said element, or in case of a crystal—the crystal axis, which coincides with the cavity axis CA.

Figure 4:
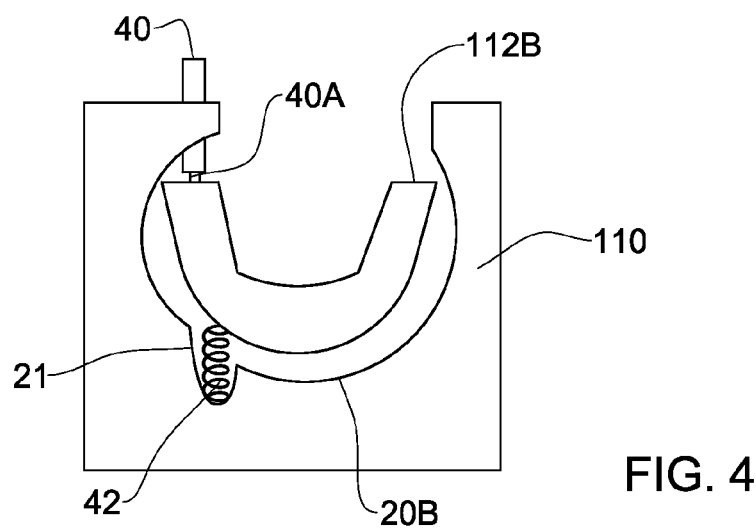
FIG. 4 shows schematically an example of a positioning unit used in the device of FIGS. 2A-2B.

As exemplified in FIG. 4, this can be implemented by an assembly including an elongated element 40 mounted for reciprocating movement with respect to the support element 112B, preferably along an axis perpendicular the axis of rotation of the support element, and a spring 42 located below the support element 112B. Such movement of the element 40 towards the support 112B results in that the element 40, by its distal end 40A, contacts the rotatable support 112B and pushes it for rotation against the tension of the spring. The spring is located in an appropriate groove 21 made in the cavity portion 20B. The spring 42 presents a retaining mechanism applying a torque on the rotatable support "pushing" it towards the pin 40.

Figure 5:
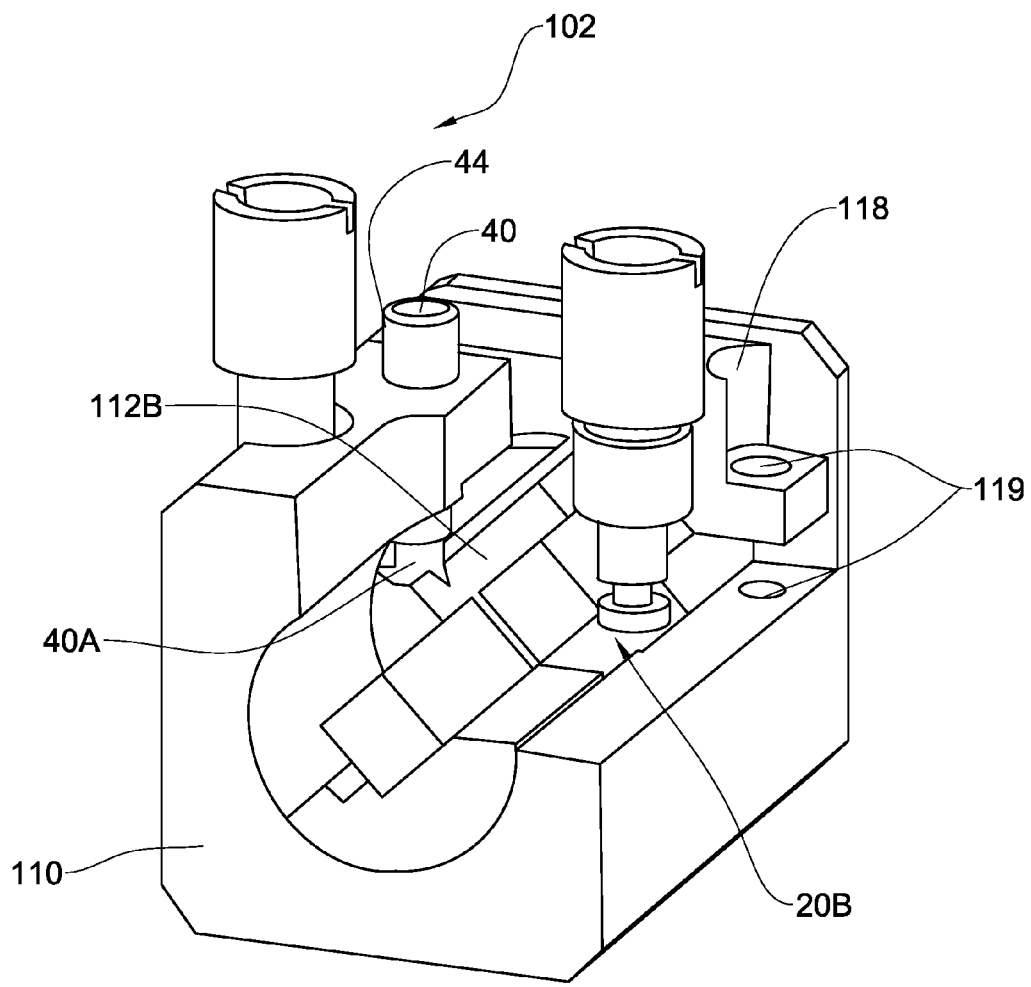
FIG. 5 is a perspective assembled view of the device of FIGS. 2A-2B.

As shown more specifically in FIG. 5, the elongated element 40 is in the form of a bolt, mounted (screwed) in a hole 44 made in the housing at an appropriate location above the cavity portion 20B. The distal end 40A of the bolt 40 contacts the rotatable support 112B.

Turning back to FIG. 1B, during the rotation of the crystal element 10', the time profile of light output from the system is detected at the detection unit 33, and upon identifying the desired profile (with no or with reduced sideband pulses), the corresponding angular position of the rotating crystal is fixed. This is implemented by fixing the bolt 40 position relative to the support 112B, e.g. using a fastening bracket 118 and the bracket fixation bolt-and-nut assembly (not shown) mountable on the housing using appropriate holes 119.

It should be understood, although not specifically described here, that in case the system utilizes electro-optical elements 10 and 10', an electrodes' arrangement with its associated electronics are appropriately mounted on the housing.

Thus, the system 100 operates as follows: The first static support 112A carrying the fixed thereto optical element 10 is fixed inside the cavity portion 20A, and the second rotatable support with the attached thereto optical element 10' is mounted inside the cavity portion 20B such that the optical axes Y and Y' of the elements coincide with the cavity axis CA. Bolt 40 is moved towards support 112B to cause its rotation and thereby cause axial rotation of the optical element 10' around the cavity axis CA. Concurrently, the light output profile is being detected. When the desired profile is observed, the corresponding angular position of the optical element 10' is fixed by fixing the position of the support 112B using the fastening bracket 118. The system 100 is thus brought to the optimal operation condition.

Those skilled in the art will readily appreciate that various modification and changes can be applied to the embodiments of the invention as hereinbefore described without departing from its scope defined in and by the appended claims.

The invention claimed is:

1. An optical device comprising:
   a cavity defining a cavity axis of light propagation;
   at least two optical elements having their optical axes, respectively, and being aligned along said cavity axis such that the optical axes of the optical elements coincide with said cavity axis, at least one of the at least two optical elements being fixed on a rotatable support; and
   a positioning unit associated with said at least one of said at least two optical elements and comprising an angular adjustment mechanism configured to push said rotatable support element to rotate around its axis of symmetry coinciding with the optical axis of said element and with the cavity axis for providing controllable axial rotation of said at least one optical element about the cavity axis, thereby enabling controllable fine adjustment of orientation of said at least one optical element relative to the at least one other optical element, while keeping the aligned positions of the optical elements with respect to said cavity axis.

2. The device of claim 1, wherein said at least two optical elements are crystals.

3. The device of claim 1, wherein the position of said at least one other optical element is fixed within the cavity.

4. The device of claim 1, wherein the at least one rotatable optical element is prevented from movement along said cavity axis.

5. The device of claim 1, wherein the at least one rotatable optical element is prevented from being tilted with respect to said cavity axis.

6. The device of claim 1, wherein each of the optical elements is mounted on its own support at a fixed position with respect to the support, and the support of said at least one optical element is mounted for axial rotation about said cavity axis.

7. The device of claim 1, configured and operable as a Pockels cell.

8. A system comprising the optical device of claim 1 and a light detection unit for receiving light output from said optical device and generating data indicative thereof, thereby enabling controlling the axial rotation of said at least one of the optical elements about the cavity axis in accordance with a desired output of the optical device to be obtained.

9. The device of claim 1, wherein said cavity has two substantially cylindrical cavity portions arranged along a common symmetry axis and defining two sites, respectively, for accommodation of the two optical elements with their respective supports, the symmetry axis coinciding with the cavity axis.

10. The device of claim 1, comprising a fixation mechanism for fixing an angular position of said at least one optical element upon identifying that its rotation about the cavity axis has brought it to a desired orientation with respect to the other optical element, said desired orientation being identifiable as corresponding to a predetermined time profile of light output from the device.

11. A system comprising:
an optical device comprising a cavity defining a cavity axis of light propagation; at least two optical elements having their optical axes, respectively, and being aligned along said cavity axis such that the optical axes of the optical elements coincide with said cavity axis; and a positioning unit associated with at least one of said optical elements and configured and operable for providing controllable axial rotation of said at least one optical element about the cavity axis, thereby enabling controllable adjustment of a position of said at least one optical element relative to a position of the at least one other optical element, while keeping the aligned positions of the optical elements with respect to said cavity axis; and
a light detection unit for receiving light output from said optical device and generating data indicative thereof, thereby enabling controlling the angular position of said at least one of the optical elements in accordance with the desired output of the optical device light to be obtained.

12. The device of claim 11, wherein said cavity is configured to prevent any movement of said at least one optical element other than said controllable axial rotation thereof about the cavity axis.

13. The system of claim 11, wherein said data indicative of the received output light is indicative of a time profile of the output light, thereby enabling to control the output light during manipulation of the angular position of the rotatable optical element, and fixing the optimal position of said element in accordance with the desired light output to be obtained.

14. The device of claim 11, wherein said cavity is configured to prevent any movement of said at least one optical element other than said controllable axial rotation thereof about the cavity axis.

15. The device of claim 11, wherein said cavity has two substantially cylindrical cavity portions arranged along a common symmetry axis and defining two sites, respectively, for accommodation of the two optical elements with their respective supports, the symmetry axis coinciding with the cavity axis.

16. The device of claim 11, wherein the at least one rotatable optical element is fixed on a rotatable support, and the positioning unit comprises an angular adjustment mechanism configured to push said rotatable support element to rotate around its axis of symmetry coinciding with the optical axis of said element and with the cavity axis.

17. The device of claim 11, wherein each of the optical elements is mounted on its own support at a fixed position with respect to the support, and the support of said at least one optical element is mounted for axial rotation about said cavity axis, the positioning unit comprising an angular adjustment mechanism configured to push said rotatable support element to rotate around its axis of symmetry coinciding with the optical axis of said element and with the cavity axis.

18. The device of claim 11, comprising a fixation mechanism for fixing an angular position of said at least one optical element upon identifying that its rotation about the cavity axis has brought it to a desired orientation with respect to the other optical element, said desired orientation being identifiable as corresponding to a predetermined time profile of light output from the device.

19. An optical device comprising:
a cavity defining a cavity axis of light propagation;
at least two electro-optical crystals having their optical axes, respectively, and being aligned along said cavity axis such that the optical axes of the optical elements coincide with said cavity axis, said cavity having two substantially cylindrical cavity portions arranged along a common symmetry axis and defining two sites, respectively, for accommodation of the two optical elements with their respective supports, the symmetry axis coinciding with the cavity axis; and
a positioning unit associated with at least one of said electro-optical crystals and comprising a mechanical assembly configured and operable for providing controllable axial rotation of said at least one crystal about the cavity axis at a certain angle while preventing any other movement of said at least one crystal, thereby enabling controllable fine adjustment of orientation of said at least one crystal relative to the at least one other crystal, while keeping the aligned positions of the crystals with respect to said cavity axis.

20. An optical device comprising:
a cavity defining a cavity axis of light propagation;
at least two optical elements having their optical axes, respectively, and being aligned along said cavity axis such that the optical axes of the optical elements coincide with said cavity axis, at least one of said at least two optical elements being fixed on a rotatable support; and a positioning unit associated with at least one of said at least two optical elements and configured and operable for providing controllable axial rotation of said at least one optical element about the cavity axis, thereby enabling controllable fine adjustment of orientation of said at least one optical element relative to the at least one other optical element, while keeping the aligned positions of the optical elements with respect to said cavity axis, said the at least one rotatable optical element being fixed on a rotatable support, said positioning unit comprising an elongated element which is mounted for reciprocating movement from its retracted inoperative position in which its distal end is spaced from said rotatable support to its extracted position in which the distal end is brought into contact with said rotatable support pushing it for said rotation about the cavity axis.

21. An optical device comprising:

a cavity defining a cavity axis of light propagation;

at least two optical elements having their optical axes, respectively, and being aligned along said cavity axis such that the optical axes of the optical elements coincide with said cavity axis;

a positioning unit associated with at least one of said at least two optical elements and configured and operable for providing controllable axial rotation of said at least one optical element about the cavity axis, thereby enabling controllable fine adjustment of orientation of said at least one optical element relative to the at least one other optical element, while keeping the aligned positions of the optical elements with respect to said cavity axis; and a fixation mechanism for fixing an angular position of said at least one optical element upon identifying that its rotation about the cavity axis has brought it to a desired orientation with respect to the other optical element, said desired orientation being identifiable as corresponding to a predetermined time profile of light output from the device.

22. An optical device comprising:

a cavity defining a cavity axis of light propagation;

at least two optical elements having their optical axes, respectively, and being aligned along said cavity axis such that the optical axes of the optical elements coincide with said cavity axis;

a positioning unit associated with at least one of said at least two optical elements and configured and operable for providing controllable axial rotation of said at least one optical element about the cavity axis, thereby enabling controllable fine adjustment of orientation of said at least one optical element relative to the at least one other optical element, while keeping the aligned positions of the optical elements with respect to said cavity axis; and a light detection unit for receiving light output from said optical device and generating data indicative thereof, thereby enabling controlling the axial rotation of said at least one of the optical elements about the cavity axis in accordance with a desired output of the optical device to be obtained.

23. An optical device comprising:

a cavity defining a cavity axis of light propagation;

at least two optical elements having their optical axes, respectively, and being aligned along said cavity axis such that the optical axes of the optical elements coincide with said cavity axis, wherein said cavity has two substantially cylindrical cavity portions arranged along a common symmetry axis and defining two sites, respectively, for accommodation of the two optical elements with their respective supports, the symmetry axis coinciding with the cavity axis; and a positioning unit associated with at least one of said at least two optical elements and configured and operable for providing controllable axial rotation of said at least one optical element about the cavity axis, thereby enabling controllable fine adjustment of orientation of said at least one optical element relative to the at least one other optical element, while keeping the aligned positions of the optical elements with respect to said cavity axis.

* * * * *